United States Patent [19]
Lankford

[11] 3,806,994
[45] Apr. 30, 1974

[54] FASTENING DEVICE FOR REINFORCING RODS

[76] Inventor: Pat B. Lankford, 401 S. Vandiver Rd., San Antonio, Tex. 78209

[22] Filed: Aug. 4, 1972

[21] Appl. No.: 277,974

[52] U.S. Cl. .................................. 24/84 B, 52/719
[51] Int. Cl. ........................ A44b 13/00, E04c 5/16
[58] Field of Search ........ 287/49; 52/719, 684, 686, 52/689; 24/81 CR, 81 B, 84 B

[56] References Cited
UNITED STATES PATENTS

| | | | |
|---|---|---|---|
| 516,291 | 3/1894 | Aylworth et al. | 287/49 |
| 611,639 | 10/1898 | Leslie | 287/49 |
| 879,148 | 2/1908 | Cummings | 52/686 |
| 3,004,370 | 10/1961 | Tinnerman | 287/49 X |
| 3,114,221 | 12/1963 | Eriksson | 52/689 X |
| 3,512,329 | 5/1970 | Du Plessis | 52/719 X |
| 3,673,753 | 7/1972 | Anderson | 52/719 |

*Primary Examiner*—Donald A. Griffin
*Attorney, Agent, or Firm*—Larson, Taylor & Hinds

[57] ABSTRACT

A fastening device for joining orthogonal, non-intersecting reinforcing rods or bars is provided which includes a bifurcated hook portion which straddles the upper rod and the U-shaped hook arms of which extend under the lower rods to engage and support them. The hook portion is integral with an elongate shank a curved portion of which forms a fulcrum about which the device is pivoted during installation. When in position, the shank extends along the upper rod and a clip formed at the other end of the shank clips the device to the upper rod to tension the shank and bring the hook arms into firm engagement with the lower rod so that the two rods are held rigidly together.

10 Claims, 7 Drawing Figures

PATENTED APR 30 1974 3,806,994

FASTENING DEVICE FOR REINFORCING RODS

FIELD OF THE INVENTION

The invention relates to fastening devices for interconnecting orthogonal, crossed bars or rods.

BACKGROUND OF THE INVENTION

The construction industry utilizes structural units employing steel reinforcing bar or rod assemblies in many applications, such as in mats for highways, runways and the like, cages for vertical and three dimensional structures and so on. These assemblies comprise orthogonal rods or bars which cross but do not intersect and which thus require some means for rigidly interconnecting pairs of crossing rods together. Conventionally, this is done by wiring the rods together and while wire is relatively cheap, labor is not and the process of wiring the rods together on large assembly can be quite time consuming.

Other techniques have been suggested to replace the wiring together of the rods and, in particular, clips and clamps of various types have been proposed for this purpose. However, these devices have not achieved widespread acceptance for a variety of reasons. For example, some of these devices are awkward or cumbersome to handle and in some instances require more time and effort to install than wires. Further, these and others of such devices suffer additional disadvantages such as a tendency to "pop" off or otherwise become separated from the rods when the assembly is flexed and manufacturing difficulties owing to their complex shapes. Finally, the expense of the devices is in many instances so great that any saving in labor is more than offset by manufacturing costs.

Some examples of fastening devices used for this and other somewhat related purposes are found in U.S. Pat. Nos. 611,639 (Leslie), 727,245 (Williams), 1,434,352 (Juter), 2,523,785 (Sereno), 3,004,370 (Tinnerman), and 3,108,828 (Kus), although this list is not in any way intended to be exhaustive.

SUMMARY OF THE INVENTION

In accordance with the invention, a fastening device for reinforcing bars or rods is provided which comprises what can be termed a cantilever type spring clip. The fastening device of the invention fulfills what can be truely characterized as a long felt need for an easy to use, quickly installed, positively acting fastening device for the purposes discussed. The fastening device of the invention is easy and economical to manufacture and enables providing the necessary rigidity in a reinforcing bar assembly with a minimum time and effort. In this latter regard, the fastening device of the invention can be quickly snapped on using one hand only. This is also a safety feature of the invention since it permits use of the other hand for holding on or stabilizing the assembly which can be important in difficult or awkward structures. The resultant assembly is also easier to handle, particularly with the elimination of loose wire ends that can stick, cut, scratch or tear clothing and does away with the need for expensive installation tools which may be broken, lost or stolen. Further, it eliminates the need for training specialized personnel such is required with devices which have been tried out in the past.

According to presently preferred embodiments thereof, the fastening device of the invention comprises an elongate body or shank portion adapted to be disposed above and along the uppermost bar of the bars to be joined together, a bifurcated hook portion joined to the body portion at one end thereof and including a pair of curved, generally U-shaped arms for, in use, engaging and supporting the lowermost bar, and a fastening or clip portion joined to the other end of the body portion for securing the device to the uppermost bar. A slot between the arms is adapted to receive the uppermost bar therein so that the arms straddle the upper bar and a portion of the body or shank forms a fulcrum about which the device is pivoted during installation. Snapping of the clip portion onto the upper bar tensions the body portion and brings the U-shaped arms of the hook portion into firm, snug engagement with the lower bar so that the reinforcing bars are held firmly together to form a rigid assembly.

Other features and advantages of the invention will be set forth in or apparent from the detailed description of preferred embodiments found hereinbelow.

DESCRIPTION OF THE PREFERRED EMBODIMENTS

Figure 1:
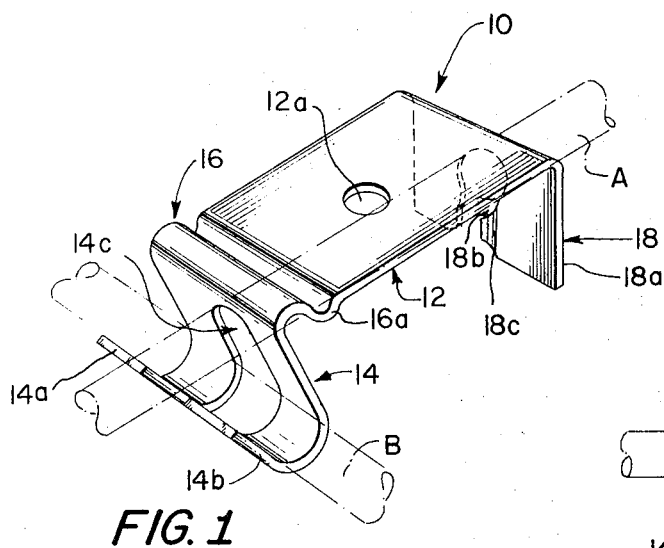
FIG. 1 is a perspective view of a first embodiment of a fastening device in accordance with the invention with the reinforcing rods joined thereby shown in phantom lines.
Figure 2:
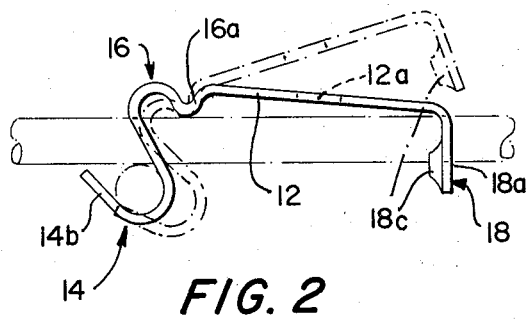
FIG. 2 is a side elevational view of the device of FIG. 1.
Figure 3:
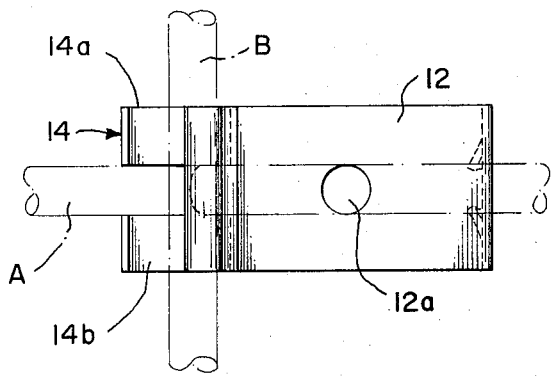
FIG. 3 is a plan view of the device of FIG. 1.

Referring to FIGS. 1 to 3, a fastening device in accordance with a first embodiment of the invention is shown. The device, which is generally denoted 10, is used to join orthogonal reinforcing rods or bars A and B shown in phantom lines and includes an elongate body portion or shank in the form of a plate 12 which, in use, lies above the uppermost rod A. A bifurcated hook or fork portion 14 includes curved arms or tines 14a and 14b which are generally U-shaped in cross section. A slot or space 14c between arms 14a and 14b is adapted to receive the uppermost rod A therein so that the hook portion 14 straddles rod A, as shown, with the lowermost rod B supported or craddled by arms 14a, 14b.

Hook portion 14 of fastening device 10 is preferably integral with body portion 12 and bent out of the same base plate of spring metal. Steel is preferred because of the strength thereof although other materials can also be used. Metal is generally preferred to plastic in that a device formed of the latter would cause a void and an area of weakness at each point of use because of the comparative lack of strength thereof. Plastic fastening devices would probably be bulkier than corresponding metal devices hence causing larger voids. Further, plastic devices may tend to pop off of the rods when the assembly is flexed.

Body portion 12 and hook portion 14 are joined together through an intermediate portion 16 which is S-shaped in cross section. The inwardly extending portion of the S-shaped curve, which is denoted 16a, contacts the upper surface of uppermost rod A as can best be seen in FIG. 2 and, as is explained in more detail, forms a transverse rib which serves as a pivot point or fulcrum when the device 10 is snapped on.

A clip or fastening portion 18 is located at the other end of body portion 12 which clips that end of the body portion 12 to uppermost rod A. In the embodiment under consideration, clip portion 18 is formed by a plate 18a which depends downwardly from body plate 12 at right angles thereto. A central notch or slot 18b in the lower edge of plate 18a is adapted to receive rod A there A. The portion of plate 18a defining slot 18b may be formed with locking protuberances or studs as shown which enable clip portion 18 to be snap fit over rod A and, with clip portion 18 in place, engage the underside of rod A to prevent ready separation of the clip portion 18 from rod A, i.e., the "popping off" of the fastening device referred to above.

In operation, fastening device 10 is placed over the uppermost rod A so that arms 14a, 14b straddle rod A, the device 10 initially being pivoted from the solid line position of FIG. 2, as shown in dashed lines, to permit arms 14a, 14b to be swung under lower rod B about the fulcrum provided by rib 16a of intermediate portion 16. With this accomplished, i.e., with arms swung under rod B to form a support thereof as indicated in solid lines in FIG. 2, the other end of device 10 is pressed down so that clip portion 18 snaps onto rod B. The geometry of slot 18c and arms 18a and 18b is such that there is a tight fit between the device 10 and the rods A and B at that end and the forces holding rod B against rod A are increased when clip portion 18 is snapped onto rod A. Before clip portion 18 is snapped onto rod A, body portion 10 extends along rod A generally parallel thereto and by pressing the end thereof down when clip portion 18 is snapped into place, body portion 10 is spring tensioned. This tension is transmitted through fulcrum 16a to hook portion 14 so that rods A and B are brought into very snug contact to form a rigid assembly. It will be appreciated that installing fastening device 10 is quite simple and can be performed rapidly using one hand. It is estimated that the labor required is reduced by a factor of 5 or 6 as compared with wire ties. The simplicity of the device 10 is also readily evident which enables economical manufacture thereof. The interconnection provided by device 10 is extremely strong and rigid so that the number of devices actually required for a complete reinforcing assembly is less than would normally be necessary.

As shown in FIGS. 1 to 3, body plate 12 may be provided with an aperture or hole 12a therein, such as by punching, which allows a number of devices to be strung on a wire for easy access and handling. Such an aperture 12a also reduces the possibility of an air lock, thus preventing a possible void when the concrete is poured in a horizontal form.

Figure 4:
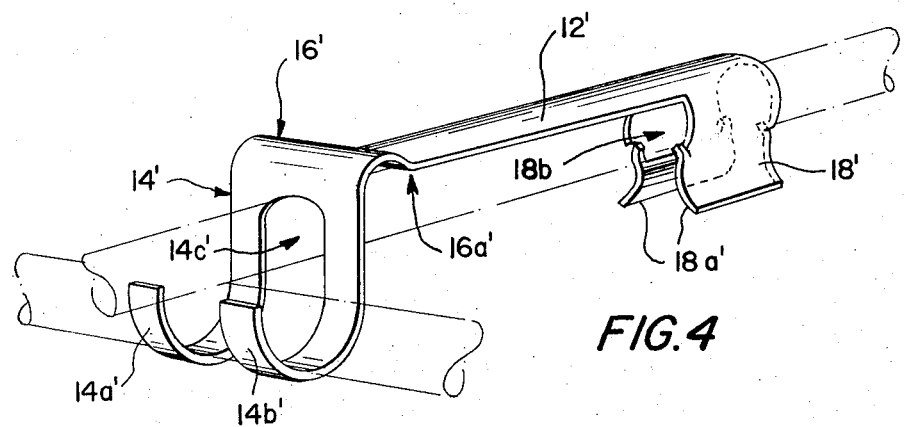
FIG. 4 is a perspective view of a fastening device in accordance with a second embodiment of the invention.
Figure 5:
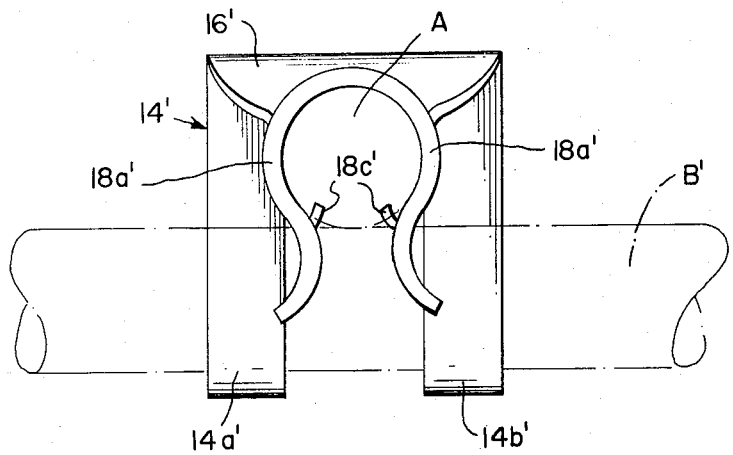
FIG. 5 is a rear end view of the device of FIG. 4 showing a detail thereof.

Referring to FIGS. 4 and 5, an alternative embodiment of the invention is shown. The fastening device of FIGS. 4 and 5 is similar to that of FIGS. 1 to 3 and corresponding elements have been given the same numbers with primes attached. The chief differences between the two embodiments lie in the shape of body portion or shank 12' and in the configuration of clip portion 18'. As illustrated, body or shank portion 12' is shaped to conform to the shape of rod A', shank 12' being cambered to fit closely against cylindrical bar A'. This adds further rigidity to the resultant assembly. The clip portion 18' is formed by opposed, inwardly curved clip arms 18a' which define an openning therebetween in which rod A is received. Arms 18a', being constructed of spring metal, are biased inwardly and provide snap fit about rod A. Burrs or protuberances formed on arms 18a' serve in preventing separation of clip 18' from rod A. The fulcrum point is provided by the area of jointure between shank 12' and hook portion 14' and is indicated at 16a'.

Figure 6:
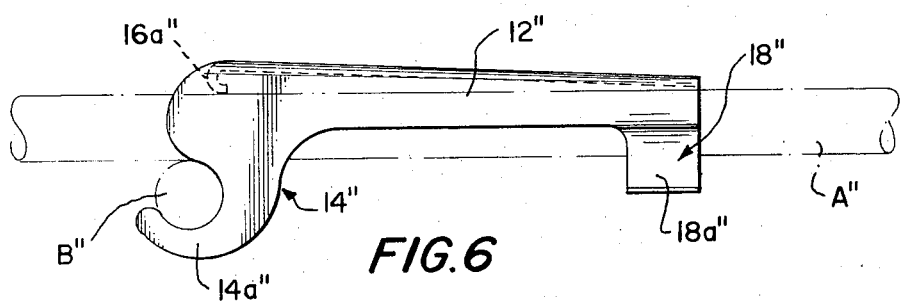
FIG. 6 is a side view of a fastening device in accordance with a further embodiment of the invention.
Figure 7:
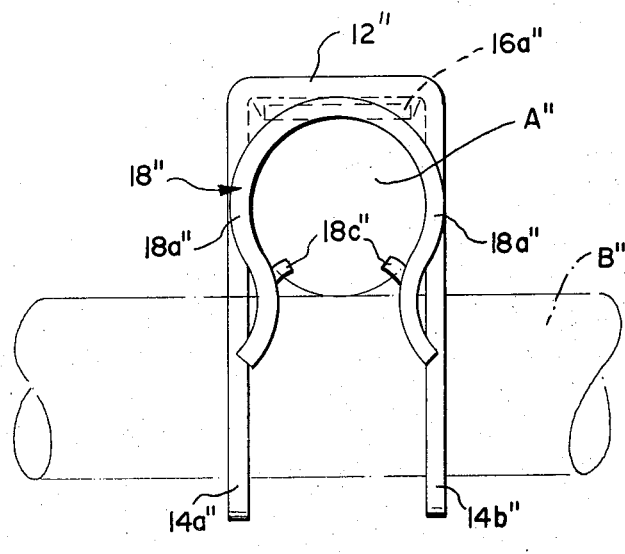
FIG. 7 is a front elevational view of the embodiment of FIG. 6.

Referring to FIGS. 6 and 7, another embodiment of the invention is shown. This embodiment is also similar to that of FIGS. 1 to 3 and corresponding elements have been given the same numbers with double primes attached. The chief differences between the two figures is the configuration of clipa clip 18'' which is similar to that of FIGS. 4 and 5, the shape of hook portion 14'' which includes flat side arms 18a'' and 18b'' as shown, and the construction of fulcrum 16a''. Fulcrum 16a'' is formed by a portion cut out of shank 12'' in the area of slot 18c'' and turned under as shown in FIG. 6. Again, snapping of clip portion 18'' onto rod A'' tightens the engagement of arms 18a''', 18b'' with rod B'' so that rod B'' fits tightly against rod A''.

A number of other embodiments of the invention are also possible. For example, the clip portion 18 of the embodiment of FIGS. 1 to 3 can be modified to resemble that of the remaining figures by forming a similar two-arm clip at the end of body portion 12. This can be done simply by merely cutting into body portion 12 on both sides and bending or folding the arms down from the two portions so formed. Further, the shape of the protuberances 18c can be modified and can comprise thickened lower portions of plate 18a which extend rearwardly of the plate. In addition, the shape of body plate 12 can be modified so as to taper or neck down to a two-arm clip similar to as described above, with the sides of the plate bent down to form the clip, or simply reduced in width such as by scalloping both side edges to save metal and reduce the weight of the device. Also, plate 18a can be bent inwardly and downwardly, rather than extending straight down. These modifications are only exemplary and it will be understood by one skilled in the art that other variations and modifications can be effected in the embodiments described above without departing from the scope and spirit of the invention.

I claim:

1. A fastening device for joining orthogonal reinforcing bars or rods comprising an elongate body portion adapted to be disposed above and along the uppermost bar of the bars to be joined together, a bifurcated hook portion joined to the body portion at one end thereof and including a pair of curved arms for, in use, engaging the underside of the lowermost bar, said arms defining a slot therebetween for, in use, receiving therein the uppermost bar of the bars to be joined so that said hook portion straddles the uppermost bar and said arms extend under the lowermost bar to provide cradle support therefor, and means located at the other end of said body portion for securing said device to the uppermost bar, said body portion including means defining a fulcrum which contacts the uppermost bar.

2. A device as claimed in claim 1 wherein said fulcrum defining means is formed by a curved section of said body portion located adjacent said hook portion.

3. A device as claimed in claim 2 wherein said hook portion is integral with said body portion, said hook portion including a U-shaped support section in which the lowermost bar is received and said hook portion and said body portion being joined through an S-shaped section, said fulcrum defining curved section of said body portion being formed by an inwardly projecting portion of said S-shaped section.

4. A device as claimed in claim 1 wherein said curved portion is formed by a tab bent out from said body portion and folded thereunder.

5. A device as claimed in claim 1 wherein said device is constructed of a resilient material.

6. A device as claimed in claim 5 wherein said device is constructed of spring metal.

7. A device as claimed in claim 1 wherein said securing means comprises means defining a slot in which the uppermost bar is received and means for retaining the upeprmost bar in said slot.

8. A device as claimed in claim 7 wherein said retaining means comprises means for engaging the underside of the uppermost bar to aid in locking the device in place.

9. A device as claimed in claim 1 wherein said means for engaging the uppermost bar comprises clip means comprising a pair of inwardly biased arms between which the bar is received.

10. A device as claimed in claim 1 wherein said body portion is axially shaped to conform to the shape of the bars.

* * * * *